United States Patent [19]

Handler

[11] Patent Number: 4,770,292
[45] Date of Patent: Sep. 13, 1988

[54] HANGING NESTING STORAGE CONTAINERS

[75] Inventor: Michael D. Handler, Norwalk, Conn.

[73] Assignee: Velcro Industries B.V., Netherlands

[21] Appl. No.: 893,384

[22] Filed: Aug. 5, 1986

[51] Int. Cl.$^4$ .................. B65D 21/02; B65D 71/00
[52] U.S. Cl. .............................. 220/23.4; 206/223; 220/18; 248/205.2
[58] Field of Search ............... 220/23.4, 23.6, 18; 206/387, 504, 223; 248/205.2; 24/306

[56] References Cited

U.S. PATENT DOCUMENTS

| | | |
|---|---|---|
| 1,638,073 | 8/1927 | Van Heusen . |
| 2,728,480 | 12/1955 | Close . |
| 3,063,749 | 11/1962 | Struble ............... 297/DIG. 6 |
| 3,176,364 | 4/1965 | Dritz . |
| 3,192,306 | 6/1965 | Skonnord . |
| 3,251,399 | 5/1966 | Grossman . |
| 3,413,656 | 12/1968 | Vogliano et al. . |
| 3,475,810 | 11/1969 | Mates . |
| 3,491,486 | 1/1970 | Caruth . |
| 3,506,321 | 4/1970 | Hample ................... 220/23.4 |
| 3,512,318 | 5/1970 | Turner . |
| 3,668,808 | 6/1972 | Perina . |
| 3,696,472 | 10/1972 | Perina et al. . |
| 3,745,709 | 7/1973 | Perina . |
| 3,856,369 | 12/1974 | Commiant ................ 206/387 |
| 4,084,865 | 4/1978 | Joyce ........................ 206/387 |
| 4,165,555 | 8/1979 | Boxer et al. . |
| 4,170,082 | 10/1979 | Freedman ................. 206/504 |
| 4,260,077 | 4/1981 | Schroeder ............... 220/23.4 |
| 4,271,566 | 1/1981 | Perina . |
| 4,452,362 | 6/1984 | Mancin ................... 248/205.2 |
| 4,489,115 | 12/1984 | Layman ..................... 24/306 |
| 4,493,174 | 1/1985 | Arens . |
| 4,509,930 | 4/1985 | Schweigert ............... 220/4 F |
| 4,548,375 | 10/1985 | Moss ...................... 248/205.2 |

FOREIGN PATENT DOCUMENTS

| | | | |
|---|---|---|---|
| 562962 | 5/1967 | Italy ........................ 220/23.4 |
| 387473 | 5/1965 | Switzerland ............. 248/205.2 |

Primary Examiner—George E. Lowrance
Attorney, Agent, or Firm—Hayes, Davis & Soloway

[57] ABSTRACT

A set of hanging nesting storage containers. Each of the containers comprises a square box having a planar base with top and bottom surfaces and four sides extending upward perpendicular to the top surface. A rectangular fastening lip extends outward from the base perpendicular to one of the sides. One component of hook and loop fastening material is disposed on opposed surfaces of the lip and a strip of the other component of hook and loop fastening material is disposed on the bottom surface of the base beneath the side adjacent the side from which the lip extends outward whereby the containers can be releasably hung by the lip from a shear trap channel containing the other component of hook and loop fastening material therein and four of the containers can be nested with the lip of each disposed under and in engagement with the strip of material on a next adjacent container.

10 Claims, 1 Drawing Sheet

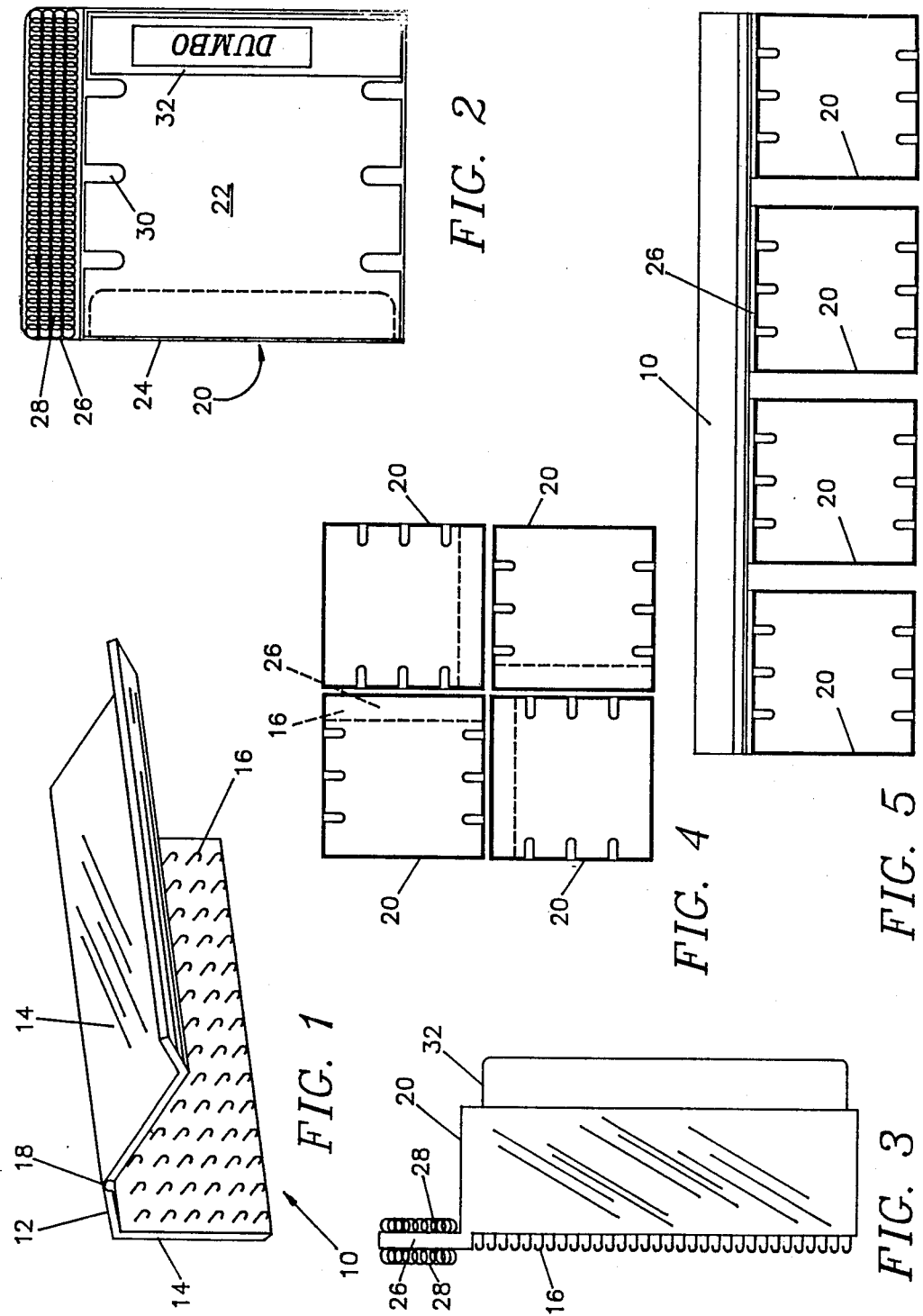

HANGING NESTING STORAGE CONTAINERS

BACKGROUND OF THE INVENTION

The present invention relates to storage containers and, more particularly, to a set of hanging nesting storage containers wherein each of the containers comprises a square planar base with top and bottom surfaces having four side members extending upward penpendicular to the top surface; a rectangular planar fastening member extending outward from one of the side members in a plane parallel to and slightly below the plane of the base; one component of hook and loop fastening material disposed on opposed surfaces of the planar fastening member; and, a strip of the other component of hook and loop fastening material disposed on the bottom surface of the base beneath the side member adjacent the side member from which the fastening member extends outward whereby each of the containers can be releasably hung by the fastening member from a shear trap channel containing the other component of hook and loop fastening material therein and four of the containers can be nested with the fastening member of each disposed under and in engagement with the strip of material on a next adjacent container.

It is often desirable to take audio and/or video casssettes away from the home or office to another site. Typically, there are storage containers for home use and storage containers for transporting cassettes. To take a plurality of audio cassettes from the home to the auto, for example, one must remove those desired from the home storage unit and place them in a portable carrying case. Upon returning the cassettes to the home, the process must be reversed. Not only does this result in inconvenience, but, additionally, there is a duplication of functional equipment with an attendant cost.

Wherefore, it is the object of the present invention to provide a container system primarily directed at the storage and transportation of cassettes wherein the same containers can be used for home storage and for transportation.

SUMMARY

The foregoing object has been achieved by the set of hanging nesting storage containers of the present invention wherein each of the containers comprises a square planar base with top and bottom surfaces having four side members extending upward perpendicular to the top surface. A rectangular planar fastening member extends outward from one of the side members in a plane parallel to and slightly below the plane of the base. One component of hook and loop fastening material is disposed on opposed surfaces of the planar fastening member and a strip of the other component of hook and loop fastening material is disposed on the bottom surface of the base beneath the side member adjacent the side member from which the fastening member extends outward. As thus configured, the containers can be releasably hung by the fastening member from a shear trap channel containing the other component of hook and loop fastening material therein and four of the containers can be nested with the fastening member of each disposed under and in engagement with the strip of material on a next adjacent container.

In the preferred embodiment, the fastening member has a top surface which lies in the plane of the bottom surface of the base. Additionally in the preferred embodiment, each container is a container for holding recording cassettes and additionally includes means for holding and separating a plurality of cassettes.

DESCRIPTION OF THE DRAWINGS

FIG. 1 is a perspective view of a shear trap channel as used for securely and releasably holding the containers of the present invention on a wall or other surface such as in the home or automobile.

FIG. 2 is a plan view of a storage container for cassettes according to the present invention.

FIG. 3 is a side view of the container of FIG. 2.

FIG. 4 is a plan view of four containers according to the present invention in their nested state.

FIG. 5 shows the containers of FIG. 4 un-nested and hanging for a shear trap channel strip such as that of FIG. 1.

DESCRIPTION OF THE PREFERRED EMBODIMENT

In my co-pending patent application entitled SHEAR TRAP HOOK AND LOOP FASTENING SYSTEM, filed on even date herewith and assigned to the common assignee of this application, I described an improvement to hook and loop fastening systems wherein a shear trap channel is employed to use the hook and loop fastening material "in shear" to provide a high holding strength. The shear trap channel, however, allows the hook and loop fastening materials to be disengaged easily when necessary. The teachings of that co-pending application are hereby incorporated herein by reference, and accordingly, only a cursory description of the basic invention as incorporated into this invention will be provided.

Turning briefly to FIG. 1, the shear trap channel of my above-referenced co-pending application is shown in simplified form. The shear trap channel is indicated as 10 and comprises a back portion 12 from which two parallel, spaced side portions 14 extend. In the preferred embodiment, the trap channel 10 is made of a resiliently rigid plastic. In the embodiment of FIG. 1, as preferred for use with the present invention, one side portion 14 is connnected by a hinge in the form of a living hinge 18 formed in the plastic to the back. The other side portion 14 can have peel and stick adhesive (not shown) on the outside surface thereof or be attached by screws, etc. as a convenient method of mounting the channel 10 to a wall or other surface. The facing inner surfaces of the side portions 14 have the hook portion 16 of hook and loop type fastening material thereon. Thus, if a planar member (not shown) having the loop material on outward facing parallel surfaces is inserted between the side portions 14, the planar member will be maintained therein with the hook and loop material operating "in shear". By swinging the side portion 14 outward, however, the hook and loop materials can be progressively released to allow the planar member to be withdrawn. As those skilled in the art will readily appreciate, the hook and loop portions could be interchanged if desired.

Turning now to FIGS. 2 and 3, the basic container of the present invention is generally indicated as 20. The container 20 is a rectangular box having a planar base 22 from which four sides 24 extend upward perpendicular thereto. It should be noted that while a cassette container is shown by way of example, there are other containers that could be designed within the scope and spirit of the present invention to achieve the benefits afforded thereby.

A fastening member in the form of a unitary planar fin member or lip 26 extends outward from one of the sides 24 in a plane parallel to the base 22. It is preferred that the containers 20 be formed of a tough resilient plastic so as to withstand wear and tear. Where there is any thickness to the plastic used, the preferred configuration for the lip 26 is as best seen with respect to the side view of FIG. 3; that is, the top surface of the lip 26 is in the same plane as the bottom surface of the base 22. This allows the containers to be stacked in the manner to be described hereinafter. In the case of a very thin material, such offset of the lip 26 might not be necessary as possibly the lip 26 would deform sufficiently to allow mating of the required surfaces. The opposed surfaces of the lip 26 are covered with the loop portion 28 of hook and loop fastening material such as that sold by the assignee of this application under the trademark Velcro. The Velcro materials can be applied with peel and stick adhesive, or the like. The bottom surface of the base 22 beneath a side 24 adjacent the side 24 having the lip 26 extending outward perpendicular thereto has a strip of the hook portion 16 of the Velcro hook and loop fastening material attached thereto. In each case, the strip of hook portion 16 is under the same side 24 with respect to the lip 26.

For use with cassettes, and the like it is preferred that means for separating and holding the cassettes be provided such as the dividers 30 shown holding the cassette 32 in FIG. 2. For other uses, other dividing means for subdividing the containers 20 into subcompartments could be employed.

Turning now to FIG. 4, the manner in which four of the containers 20 can be nested is shown. For nesting, the lip 26 of each container 20 is merely positioned under the strip of hook material 16 of another container 20 and the hook and loop materials are pressed together into releasable engagement.

For home storage, or the like the same four containers 20 of FIG. 4 can be hung by their lips 26 by inserting the lips 26 into a shear trap channel 10 of the type shown in FIG. 1 which has been attached to a hanging surface. If desired, additional strips of the shear trap channel 10 can be provided in other locations to allow one or more containers 20 to be releasably hung there for convenience.

A touch fastener, as used in this application, comprises a first planar backing material having a surface carrying hooks, mushrooms, balls on stems, pigtails, or the like, capable of engaging loops, hooks, mushrooms, balls on steams, pigtails, or the like, carried by a second planar backing material to releasably fasten components together. Terms herein referring to hook and loop fastening systems and parts thereof shall be construed to include other types of touch fasteners in which the fastening strength in shear (i.e. against forces applied in the plane of the fastener) substantially exceeds the fastening strength resisting peeling separation of the fastener by the application of force normal to the plane thereof.

Wherefore, having thus described my invention, I claim:

1. A storage container comprising a base with top and bottom surfaces and four side members extending prependicularly upward from said top surface to define an open container;

a unitary planar fin member defining parallel top and bottom surfaces, said fin member projecting from the bottom surface of said base and extending outwardly along one side thereof in a plane substantially parallel to said base;

the top surface of said fin member and the bottom surface of said base being spaced from one another in a direction normal to their surfaces by a distance substantially equal to a thickness of two engaged touch fastener components;

at least the top surface of said fin member carrying a touch fastener component thereon and the bottom surface of said base carrying a cooperating touch fastener component, adjacent a side other than the one the fin member projects from, whereby said storage container can be interconnected in a group to other similar storage containers when the touch fastener component carried on the top surface of the fin member engages with a cooperating touch fastener component carried by the bottom surface of the base of an adjacent container; and said fin member being suitable for in shear engagement with a shear trap channel member having a resiliently rigid back portion interconnecting a pair of resiliently rigid opposed side portions defining inner facing surfaces having a cooperating touch fastener component thereon, said shear trap channel being adapted to releasable receive said fin member between said inner facing surfaces with the touch fastener components engaged in shear to support said storage container, said back portion of said shear trap channel member being of a width such that upon in shear engagement the inner facing surfaces are substantially parallel to said top and bottom surfaces of said fin member, said shear trap channel having hinge means connecting at least one of said side portions to said back portion to permit said at least one side portion to pivot outwardly in a manner to effect progressive disengagement of the touch fastener components from one another when desired.

2. A storage container according to claim 1 wherein said cooperating touch fastener component carried by said base is attached along a side adjacent the side from which the fin member projects.

3. A storage container according to claim 2 wherein said container has a rectangularly shaped base.

4. A storage container according to claim 1 additionally comprising means for dividing each container into a plurality of sub-compartments.

5. A storage container according to claim 1 wherein each container is a container for holding recording cassettes and additionally comprising means for holding and separating a plurality of cassettes contained therein.

6. A kit of parts for forming a hanging/grouping storage container comprising a base with top and bottom surfaces and four side members extending perpendicularly upward from said top surface to define an open container;

a unitary planar fin member defining parallel top and bottom surfaces, said fin member projecting from the bottom surface of said base and extending outwardly along one side thereof in a plane substantially parallel to said base;

the top surface of said fin member and the bottom surface of said base being spaced from one another in a direction normal to their surfaces by a distance substantially equal to a thickness of two engaged touch fastener components;

the top and bottom surfaces of said fin member each carrying a touch fastener component thereon, the bottom surface of said base carrying a cooperating touch fastener component, adjacent the side other than the one the fin member projects from, capable of engaging the touch fastener carried by the top surface of the fin member whereby said storage container can be interconnected in a group to other similar storage containers when the touch fastener component carried by the top surface of the fin member engages with a cooperating touch fastener component carried on the bottom surface of the base of an adjacent container; and said kit parts further including a shear trap channel member having a resiliently rigid back portion interconnecting a pair of resiliently rigid opposed side portions defining inner facing surfaces having a cooperating touch fastener component thereon, said shear trap channel being adapted to releasable receive said fin member between said inner facing surfaces with the touch fastener components engaged in shear to support said storage container, said back portion of said shear trap channel member being of a width such that upon in shear engagement of the touch fastener components the inner facing surfaces are substantially parallel to said top and bottom surfaces of said fin member, said shear trap channel having hinge means connecting at least one of said side portions to said back portion to permit said at least one side portion to pivot outwardly in a manner to effect progressive disengagement of the touch fastener components apart from one another when desired.

7. A storage container according to claim 6 wherein said cooperating touch fastener component carried by said base is attached along a side adjacent the side from which the fin member projects.

8. A storage container according to claim 6 wherein said container has a rectangularly shaped base.

9. a storage container according to claim 6 additionally comprising means for dividing each container into a plurality of sub-compartments.

10. A storage container according to claim 6 wherein each container is a container for holding recording cassettes and additionally comprising means for holding and separating a plurality of cassettes contained therein.

* * * * *